United States Patent
Kim et al.

(10) Patent No.: US 9,398,153 B2
(45) Date of Patent: Jul. 19, 2016

(54) IP BASED AUTOMATIC RESPONSE SERVICE SYSTEM AND METHOD FOR ELECTRONIC DEVICE

(71) Applicants: Samsung Electronics Co., Ltd., Suwon-si, Gyeonggi-do (KR); TI SQUARE TECHNOLOGY LIMITED, Anyang-si, Gyeonggi-do (KR)

(72) Inventors: Jae-Hwan Kim, Suwon-si (KR); Gil-Soo Lee, Anyang-si (KR); Do-Yeon Choi, Yongin-si (KR)

(73) Assignees: Samsung Electronics Co., Ltd., Suwon-si (KR); IT Square Technology Limited, Anyang-si (KR)

( * ) Notice: Subject to any disclaimer, the term of this patent is extended or adjusted under 35 U.S.C. 154(b) by 104 days.

(21) Appl. No.: 13/921,524

(22) Filed: Jun. 19, 2013

(65) Prior Publication Data

US 2014/0003599 A1   Jan. 2, 2014

(30) Foreign Application Priority Data

Jun. 29, 2012   (KR) .......................... 10-2012-0070998

(51) Int. Cl.
*H04M 3/00* (2006.01)
*H04L 12/66* (2006.01)
*H04M 3/51* (2006.01)

(52) U.S. Cl.
CPC .......... *H04M 3/5191* (2013.01); *H04M 3/5166* (2013.01); *H04M 2203/253* (2013.01)

(58) Field of Classification Search
CPC ............ H04M 3/5191; H04M 3/5183; H04M 3/5166; H04M 3/5175; H04M 3/5232; H04M 3/5133; H04M 3/523; H04M 3/51; H04L 65/1069; H04L 65/1006; H04L 65/80; H04L 65/1016
USPC ............ 379/265.09, 265.01–265.02; 370/352
See application file for complete search history.

(56) References Cited

U.S. PATENT DOCUMENTS

| 2002/0002790 A1* | 1/2002 | Foss ............................. 43/17.5 |
| 2007/0265830 A1 | 11/2007 | Sidhu et al. |
| 2010/0210245 A1 | 8/2010 | Kim |

FOREIGN PATENT DOCUMENTS

| JP | 2006-279675 A | 10/2006 |
| KR | 10-2009-0058053 A | 6/2009 |

* cited by examiner

*Primary Examiner* — Rasha Al Aubaidi
(74) *Attorney, Agent, or Firm* — Jefferson IP Law, LLP

(57) ABSTRACT

An electronic device using an Internet Protocol (IP) telephony technology and a method and system for forwarding information between the electronic device and a call center system are provided. The method includes sending, by an electronic device, a telephony connection request to a call center system, generating, by a switch device, a response message including connection information of a web ARS server of the call center system in response to the telephony connection request, sending, by the switch device, the response message including the connection information to the electronic device, forming, by the electronic device, a data session with the web ARS server using the received connection information of the web ARS server, and providing the ARS of the display scheme using information received from the web ARS server.

13 Claims, 11 Drawing Sheets

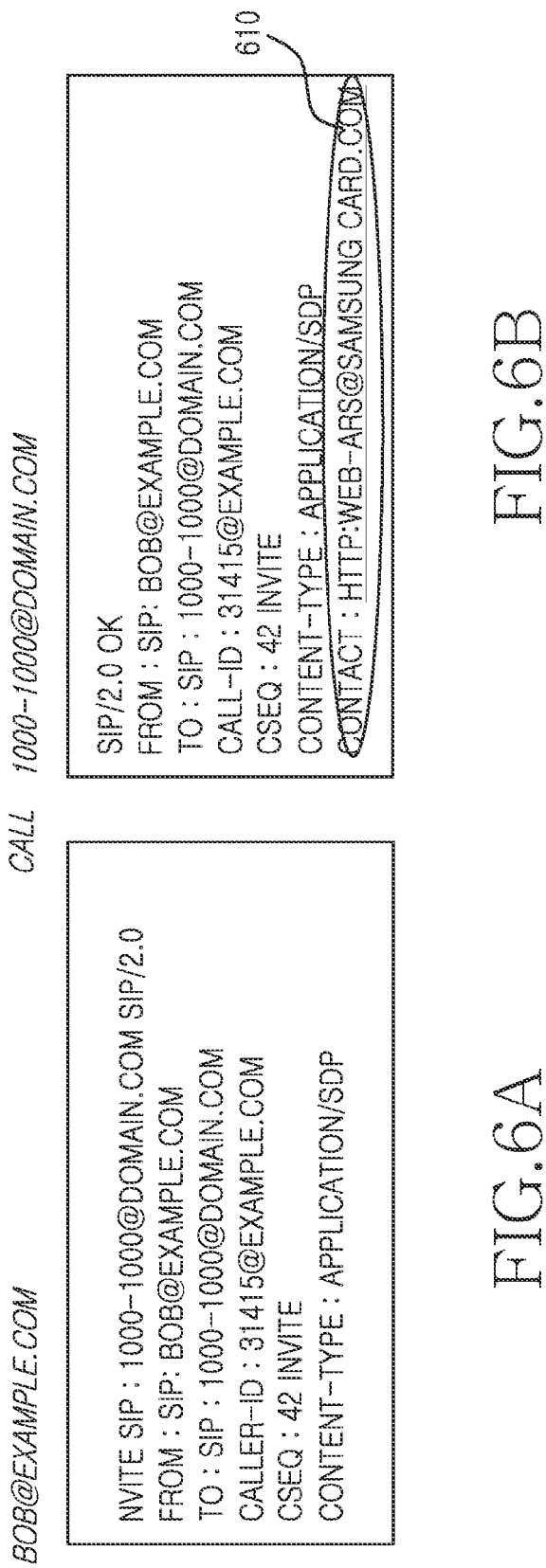

IP BASED AUTOMATIC RESPONSE SERVICE SYSTEM AND METHOD FOR ELECTRONIC DEVICE

PRIORITY

This application claims the benefit under 35 U.S.C. §119(a) of a Korean patent application filed on Jun. 29, 2012 in the Korean Intellectual Property Office and assigned Serial No. 10-2012-0070998, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co., Ltd. and 2) TI SQUARE TECHNOLOGY LIMITED.

BACKGROUND OF THE INVENTION

1. Field of the Invention

The present invention relates to a system for forwarding information between an electronic device and a call center system by using an Internet Protocol (IP) telephony technology. More specifically, the present invention relates to an Internet call center system which uses an IP telephony technology and a mobile web technology.

2. Description of the Related Art

Electronic devices have become necessities of modern life as a result of the portability of the electronic devices and as a result of the electronic devices being developed into multimedia equipment providing various services such as a voice and video calling function, an information input/output function, and a data storage function.

In recent years, the electronic devices and corresponding services have been developed to allow users to perform financial services, Internet shopping, and the like. In addition, enterprises providing such services to customers are managing call centers to process a Voice Of Customer (VOC). The call centers provide a voice-based Automatic Response Service (ARS) and an agent (e.g., a counselor) calling service.

According to the related art, the call center provides the voice-based automatic response service. Therefore, a user has to listen to content provided through the automatic response service. Thereafter, the user selects a desired service through a dial input. The call center generally requires the user to perform many steps before connecting the user with the agent (e.g., counselor connection). Further, the user is further inconvenienced when the user speaks by telephone directly with at a time of much traffic, because the user has to wait for a long time before being served.

In addition, call centers may not be cost feasible because a maintenance cost is increased as a result of the call center manager (e.g., the enterprise managing the call center) being required to employ a plurality of counselors and to guarantee many telephony lines so as to process even a simple service through counselor connection.

To solve the above problems of the voice based ARS, there is a need for a data based ARS of a display scheme.

Therefore, a need exists for an Internet call center system which uses an Internet Protocol (IP) telephony technology and a mobile web technology.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages below. Accordingly, an aspect of the present invention is to provide an Internet call center system which uses an Internet Protocol (IP) telephony technology and a mobile web technology.

Another aspect of the present invention is to provide an apparatus and method for providing an Automatic Response Service (ARS) of a display scheme in a call center system.

Another aspect of the present invention is to provide an apparatus and method for making possible counselor connection through an ARS of a display scheme in a call center system.

The above aspects of the present invention may be achieved by providing an IP based ARS system and method for an electronic device.

According to an aspect of the present invention, a method of providing an ARS of a display scheme in an ARS system is provided. The method includes sending, by an electronic device, a telephony connection request to a call center system, generating, by a switch device, a response message including connection information of a web ARS server of the call center system in response to the telephony connection request, sending, by the switch device, the response message including the connection information to the electronic device, forming, by the electronic device, a data session with the web ARS server using the received connection information of the web ARS server, and providing the ARS of the display scheme using information received from the web ARS server.

According to another aspect of the present invention, a method of constructing a user interface of an ARS of a display scheme in an electronic device is provided. The user interface is constructed by at least one of an initial connection screen for indicating that the electronic device is connecting with a call center system, an authentication screen for performing an authentication process with the call center system, and a main screen for indicating a type of service provided from a web ARS server of the call center system.

According to another aspect of the present invention, a method of attempting counselor connection while providing an ARS of a display scheme in an electronic device is provided. The method includes, if it is determined that a counselor connection is selected by a user on a web ARS screen of the electronic device, acquiring anchor information of the counselor connection, and attempting counselor telephony connection by using the acquired anchor information. The anchor information corresponds to counselor connection Uniform Resource Identifier (URI) information of a call center system.

According to another aspect of the present invention, an ARS system for providing an ARS of a display scheme is provided. The ARS system includes an electronic device for sending a connection request to a call center system, and a switch device for acquiring connection information of a web ARS server of the call center system corresponding to the connection request, and for transmitting the connection information to the electronic device. The electronic device forms a data session with the web server of the call center system using the received connection information of the web server, and provides the ARS of the display scheme using information received from the web server.

According to another aspect of the present invention, an electronic device for constructing a user interface of an ARS of a display scheme is provided. The electronic device includes a processor, for constructing a user interface, the user interface constructed by at least one of an initial connection screen for indicating that the electronic device is connecting with a call center system, an authentication screen for performing an authentication process with the call center system, and a main screen for indicating a type of service provided from a web ARS server of the call center system.

According to another aspect of the present invention, an electronic device for attempting counselor connection while providing an ARS of a display scheme is provided. The device includes a processor for, if it is determined that a counselor connection is selected by a user on an ARS screen of a display scheme, acquiring anchor information of the counselor connection, and attempting counselor telephony connection by using the acquired anchor information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 6A and 6B are diagrams illustrating a structure of a message used for an ARS of a display scheme according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The following description is made for an apparatus and method for providing an Automatic Response Service (ARS) of a display scheme by using an Internet call center system that uses an Internet Protocol (IP) telephony technology and a mobile web technology.

According to exemplary embodiments of the present invention, the electronic device can be a portable electronic device, or can be a device such as a portable terminal, a mobile phone, a media player, a tablet computer, a Personal Computer (PC), a handheld computer, a Personal Digital Assistant (PDA), a handheld e-book, and a portable game console. Also, the electronic device may be any portable electronic device including a device having a combination of two or more functions among these devices.

According to exemplary embodiments of the present invention, the ARS of the display scheme refers to an ARS providing a voice based ARS based on the internet.

Figure 1:
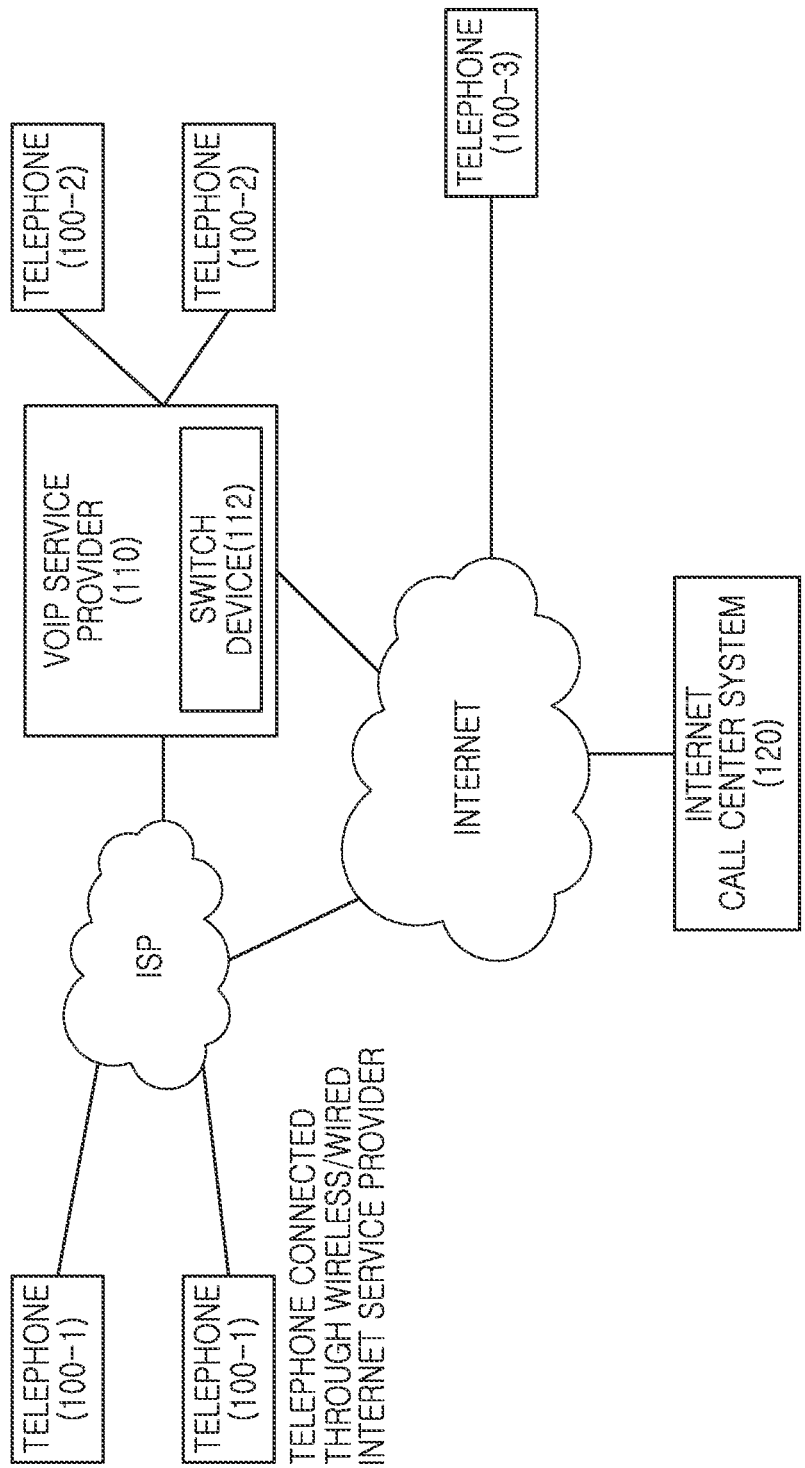
FIG. 1 is a diagram illustrating a construction of an Automatic Response Service (ARS) system providing an ARS of a display scheme according to an exemplary embodiment of the present invention.

FIG. 1 is a diagram illustrating a construction of an ARS system providing an ARS of a display scheme according to an exemplary embodiment of the present invention.

Referring to FIG. 1, the ARS system can include an electronic device 100 (e.g., telephones 100-1, 100-2, and 100-3), a Voice over IP (VoIP) service provider 110, and a call center system 120. The electronic device 100 corresponds to an electronic device of a user who intends to use an ARS of a display scheme. The electronic device 100 includes telephones 100-1 connecting with the call center system 120 through a wired/wireless Internet Service Provider (ISP), telephones 100-2 connecting with the call center system 120 through a specific VoIP service provider, a telephone 100-3 connecting with the call center system 120 through the Internet and the like. Further, the VoIP service provider 110 processes to control call processing between the electronic device 100 and the call center system 120 and provide the ARS of the display scheme.

First, the electronic device 100 can send a call connection request to the VoIP service provider 110 using a connection number of the call center system 120, thereby attempting to access the call center system 120.

The VoIP service provider 110 determines the connection number of the call center system 120 corresponding to the call connection request of the electronic device 100 and determines connection information (e.g., a Uniform Resource Locator (URL) address of a web server) of a web ARS server of the call center system 120 providing the ARS of the display scheme. Thereafter, the VoIP service provider 110 provides the determined connection information of the web ARS server of the call center system 120 to the electronic device 100. The electronic device 100 can have access to the web server of the call center system 120 using the received connection information of the web ARS server of the call center system 120. At this time, after executing a web browser, the electronic device 100 can attempt the access to the web server of the call center system 120 through the Internet.

Further, if sensing a user input of selecting a counselor connection menu on an outputted web ARS screen (e.g., an ARS screen of a display scheme), the electronic device 100 can process to forward anchor information of the counselor connection menu to an application, thereby performing telephony connection with a counselor.

The application may correspond to a program for controlling connection of the electronic device 100 with the call center system 120 and for providing the ARS of the display scheme to the electronic device 100. The application connects the electronic device 100 with the counselor by means of the received anchor information such as a Telephone (Tel) Uniform Resource Identifier (URI) or a Session Initiation Protocol (SIP) URI.

Alternately, if sensing the user input for the counselor connection menu on the outputted web ARS screen, the electronic device 100 can process to send a counselor connection request to the call center system 120 and receive connection information of the agent from the call center system 120, thereby performing telephony connection with the counselor (e.g., agent).

Further, when the electronic device 100 connects with the call center system 120 providing the ARS of the display scheme, the electronic device 100 can perform a constant authentication process and, when the electronic device 100 is connecting with the call center system 120, the electronic device 100 can output a promoting screen of a corresponding enterprise such as a welcoming message and the like.

The VoIP service provider 110 processes subscriber authentication of a voice packet network service, management thereof, call connection thereof, and the like. The VoIP service provider 110 includes a switch device (e.g., a Domain Name System (DNS) server) 112 for managing a path of the web ARS server providing the ARS of the display scheme according to exemplary embodiments of the present invention. Further, although not illustrated, the VoIP service provider 110 can include a call processing module for processing to connect the electronic device 100 to the call center system 120, a router for connecting with the electronic device 100, and the like.

For example, the VoIP service provider 110 determines a connection number of the call center system 120 corresponding to a call connection request of the electronic device 100 and determines an address of the call center system 120 providing an ARS of a display scheme that the electronic device 100 intends to use. Thereafter, the VoIP service provider 110 sends an ARS connection request to the address of the call center system 120, and receives a connection response responsive to the ARS connection request, from the call center system 120. According to an exemplary embodiment of the present invention, the connection response includes the connection information (e.g., the URL address of the web server) of the web ARS server providing the ARS of the display scheme.

According to exemplary embodiments of the present invention, the VoIP service provider 110 provides the connection response received from the call center system 120, to the electronic device 100. The electronic device 100 receiving the connection response executes a web browser. Thereafter, the electronic device 100 has access to the web ARS server of the call center system 120 by using the received connection information to use the ARS of the display scheme of the call center system 120.

For example, when the electronic device attempts call connection to a connection number '1000-1000' of a call center system corresponding to "Samsungcard", the VoIP service provider can determine the connection number '1000-1000' of the call center system and determine that an address of the call center system providing an ARS of a display scheme corresponds to '1000-1000@samsungcard.com'. According to the determined address of the call center system providing an ARS of a display scheme, the VoIP service provider sends an ARS connection request to the call center system.

Thereafter, the VoIP service provider receives a connection response notifying that an address of a web ARS server providing an ARS of a display scheme corresponds to 'http://Web-ars@samsungcard.com' from the call center system, and provides the received connection response to the electronic device.

The electronic device processes the received connection response to have access to the web ARS server having the address of 'http://Web-ars@samsungcard.com' and use the ARS of the display scheme.

According to exemplary embodiments of the present invention, the above operation can be carried out in the switch device 112 of the VoIP service provider 110.

Further, the switch device 112 can store the address of the web ARS server providing the ARS of a display scheme. The switch device 112 can acquire the connection information of the web ARS server corresponding to the connection number of the call center system 120 corresponding to the connection request of the electronic device 100, and the switch device 112 can provide the acquired connection information to the electronic device 100.

The call center system 120, which provides an ARS of a display scheme, can include the web ARS server for providing and managing web information for the ARS of the display scheme. The call center system 120 is described in detail through FIG. 2 below.

The above description has been made in which the VoIP service provider 110 includes the switch device 112 acquiring connection information of the web ARS server corresponding to an ARS connection request of the electronic device 100 and transmitting the acquired connection information to the electronic device 100. However, the switch device 112 may be included in the call center system 120 as described in relation to FIG. 2 below.

Figure 2:
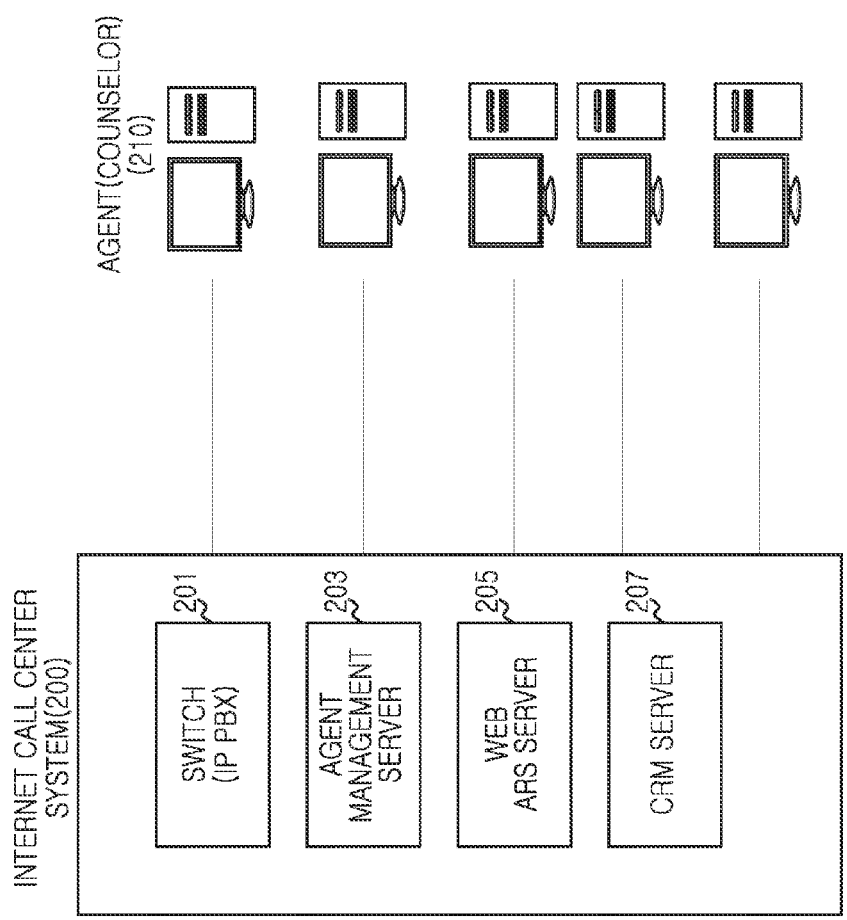
FIG. 2 is a block diagram illustrating a construction of a call center system providing an ARS of a display scheme according to an exemplary embodiment of the present invention.

FIG. 2 is a block diagram illustrating a construction of a call center system providing an ARS of a display scheme according to an exemplary embodiment of the present invention.

Referring to FIG. 2, the call center system 200, which provides an ARS of a display scheme, may include a switch 201, an agent management server 203, a web ARS server 205, and a Customer Relationship Management (CRM) server 207. The switch 201 acquires connection information of the web ARS server 205. The agent management server 203 performs a role of connecting the electronic device 100 with an agent (e.g., a counselor) 210. The web ARS server 205 manages and provides web information for the ARS of the display scheme. The CRM server 207 stores or manages information of a user who uses the ARS of the display scheme, a counseling history of the user, and the like.

The switch 201 performs the same operation as the switch device 112 included in the VoIP service provider 110 illustrated in FIG. 1.

For example, the switch 201 determines connection information of the web ARS server 205 corresponding to a connection request of the electronic device 100, and provides the connection information of the web ARS server 205 to the electronic device 100.

According to an exemplary embodiment of the present invention, the switch 201 can store connection information of the web ARS server 205 providing an ARS of a display scheme and a connection number of an enterprise (e.g., the call center system 200) providing the ARS of the display scheme. According to such an exemplary embodiment of the present invention, by comparing previously stored information and a connection number of the call center system 200 corresponding to a connection request of the electronic device 100, the switch 201 acquires connection information of the web ARS server 205 providing the ARS of the display scheme that the electronic device 100 intends to use. Thereafter, the switch 201 provides the acquired connection information to the electronic device 100.

The agent management server 203 processes to connect the electronic device 100 with the counselor 210. If the agent management server 203 determines that a user touches a counselor call button through the electronic device 100, the agent management server 203 can determine connection information of a counselor currently available for telephony, and provide the connection information of the counselor to the electronic device 100.

The web ARS server 205 is commonly referred to as a server providing an ARS of a display scheme. The web ARS server 205 can be of a different scheme according to a protocol supported in the electronic device 100. For example, the web ARS server 205 can be of a Hyper Text Transfer Protocol (HTTP) scheme, a Wireless Application Protocol (WAP) scheme, and the like.

The CRM server 207 stores or manages a voice call history between the agent 210 and the electronic device 100.

Figure 3:
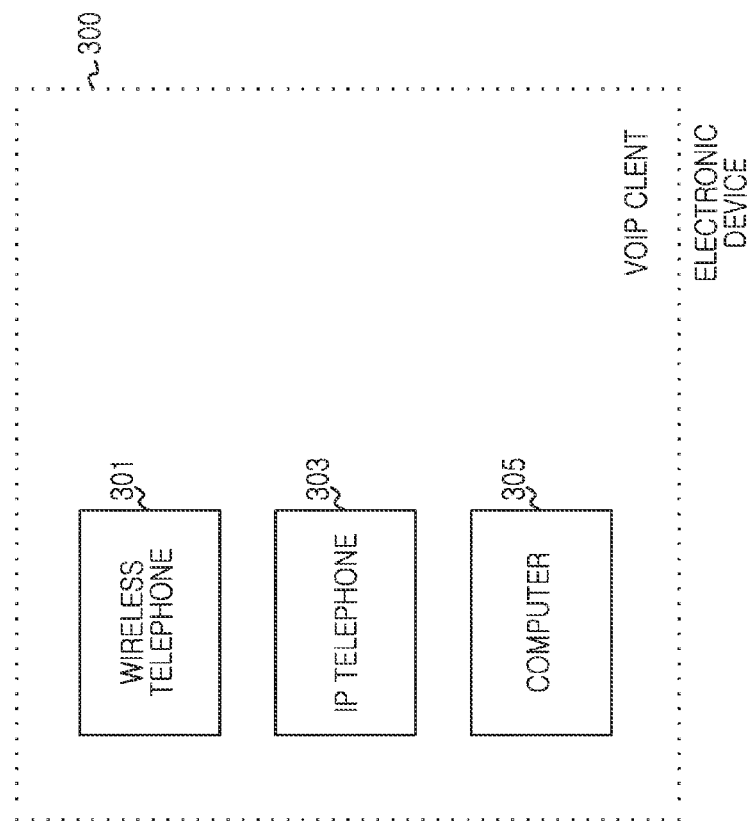
FIG. 3 is a diagram illustrating examples of an electronic device providing an ARS of a display scheme according to an exemplary embodiment of the present invention.

FIG. 3 is a diagram illustrating examples of an electronic device providing an ARS of a display scheme according to an exemplary embodiment of the present invention.

Referring to FIG. 3, the electronic device 300 represents a device capable of accessing a call center system.

The electronic device 300, which is an electronic device enabling communication based on data so as to use an ARS of a display scheme, can be a mobile communication terminal, an IP telephone, a PC, a tablet computer, a smart phone, and the like.

For example, the electronic device 300 can be a wireless telephone 301 connectable with the call center system through an Internet service provider by wireless communication, such as a smart phone, a mobile communication terminal, and the like.

As another example, the electronic device 300 can be an IP telephone 303 connecting with the call center system through a specific VoIP service provider.

As a further example, the electronic device 300 can be a PC 305 connectable with the call center system by wired/wireless communication.

The electronic device 300 corresponds to a client device which is connectable with the call center system by means of another protocol and providing an ARS of a display scheme.

Figure 4:
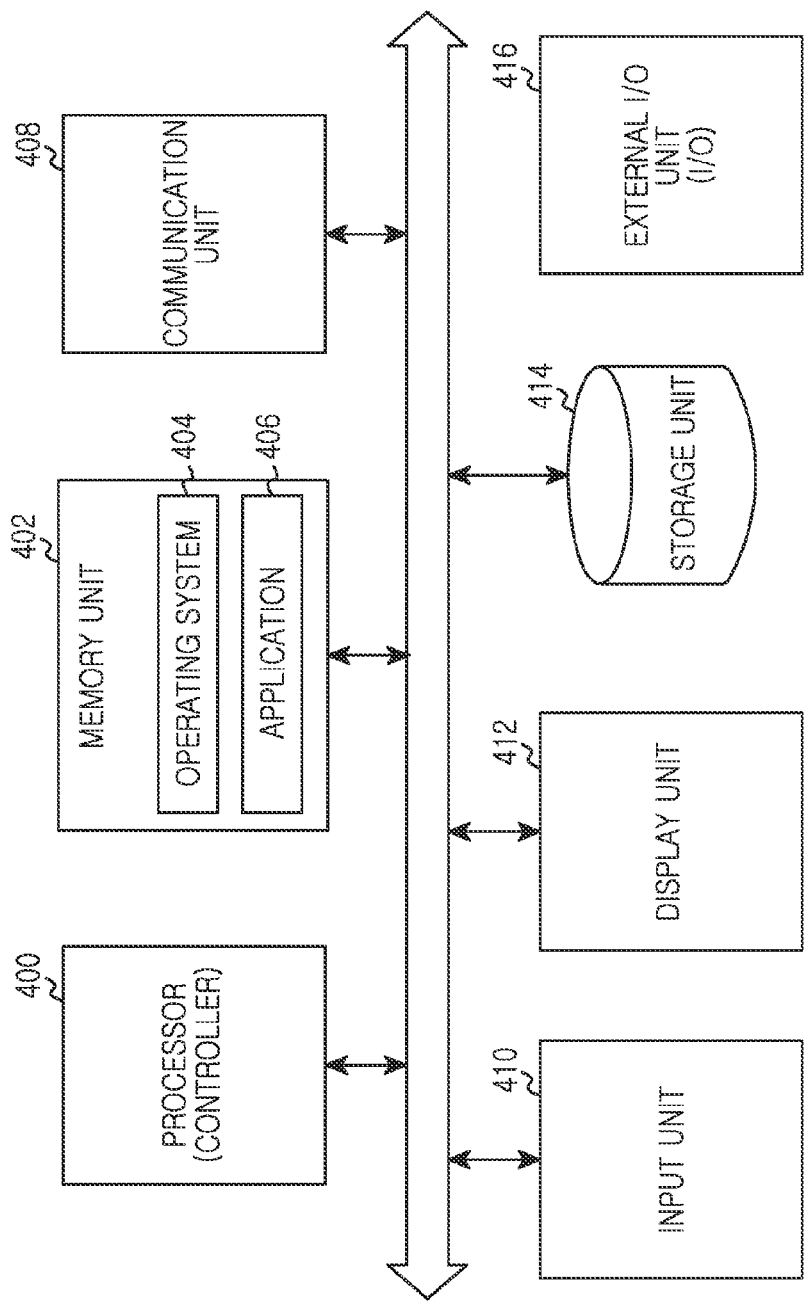
FIG. 4 is a block diagram illustrating a construction of an electronic device providing an ARS of a display scheme according to an exemplary embodiment of the present invention.

FIG. 4 is a block diagram illustrating a construction of an electronic device providing an ARS of a display scheme according to an exemplary embodiment of the present invention.

Referring to FIG. 4, the electronic device, which is a user telephone connectable with a call center system by using a wired/wireless Internet, a VoIP service, and the like, as described above, may be a mobile communication terminal, an IP telephone, a PC, a tablet computer, a smart phone, and the like. By way of example, a construction of the mobile communication terminal is described below.

The electronic device can include a processor 400, a memory unit 402, a communication unit 408, an input unit 410, a display unit 412, a storage unit 414, and an external Input/Output (I/O) unit 416. The above-mentioned constituent elements can be constructed in plural, and are accessible to one another through an interface connecting the respective constituent elements.

The memory unit 402 stores programs necessary for control of the electronic device, such as an Operating System (OS) program 404 and an application 406. The electronic device being the mobile communication terminal can store, in the memory unit 402, a communication program for making possible communication with a computer, a server and/or other electronic devices, an output program for providing and displaying a graphic (e.g., a text, a web page, an icon, a digital image, a video, an animation, and the like) on a touch screen, an interface program providing a user interface, and the like. The program included in the memory unit 402 corresponds to a set of instructions and thus, can be also expressed as an instruction set.

The OS program 404 includes various software constituent elements controlling general system operation. This control of the general system operation represents, for example, memory management and control, storage hardware (device) control and management, power control and management, and the like. The OS program 404 performs a function of enabling efficient and effective communication between various hardware (devices) and software constituent elements (modules).

The application 406 includes a software constituent element for at least one application program installed in the electronic device. Further, according to exemplary embodiments of the present invention, the application 406 includes an application program providing an ARS of a display scheme.

For instance, the application 406 receives an input of a contact of a call center system providing an ARS of a display scheme and attempts call connection with the call center system. Thereafter, the application 406 receives connection information of a web ARS server of the call center system providing the ARS of the display scheme, from the call center system.

The application 406 processes to have access to the web ARS server by using the received connection information of the web ARS server. Thereafter, the application 406 processes to receive web information corresponding to construction information of the ARS of the display scheme from the web ARS server and output the web information.

Further, when the application 406 is providing the ARS of the display scheme, if the application 406 requires connection with an agent, the application 406 receives valid connection information of the agent from the call center system and attempts connection with the agent. For example, when the application 406 is providing the ARS of the display scheme, the application 406 acquires anchor information included in an agent connection menu and attempts the connection with the agent.

Further, when the web ARS server of the call center system provides a service requiring an authentication process, the application 406 performs the authentication process for service use by using authentication information stored in the storage unit 414.

For example, the application 406 processes to output an initial connection screen for showing that it is connecting with the call center system, an authentication screen for performing the authentication process with the call center system, and a main screen for showing the kind of service provided from the web ARS server of the call center system.

At initial connection screen output, the application 406 outputs a promoting screen of a corresponding enterprise such as a welcoming message, and the like. Further, the application 406 can output a menu ending the connection with the call center system, together.

The processor 400 controls the electronic device to provide an ARS of a display scheme by using at least one software program.

According to exemplary embodiments of the present invention, the processor 400 processes to attempt connection with the call center system through dialing, acquire an address of a web server of the call center system providing the ARS of the display scheme, and connect with the web ARS server of the call center system, thereby providing the ARS of the display scheme.

The processor 400 can process to execute at least one program stored in the memory unit 402 and provide a service corresponding to the executed program. For example, the processor 400 can include a processor for performing an operation of an application program providing an ARS of a display scheme. The ARS of the display scheme of the electronic device can be carried out by at least one of software such as the program stored in the memory unit 402 and hardware such as the processor 400.

The communication unit 408 performs a communication function through one or more wireless communication systems. The communication unit 408 can include a Radio Frequency (RF) receiver and transceiver and/or an optical (e.g., infrared) receiver and transceiver. According to exemplary embodiments of the present invention, the communication unit 408 transceives a call connection request for connection with the call center system, an ARS of a display scheme, and an ARS using a voice packet network.

The input unit 410 provides input data generated by user's selection, to the processor 400. For example, the input unit 410 includes only a control button for control of the electronic device. As another example, the input unit 410 can be composed of a keypad for receiving provision of input data from a user.

If the input unit 410 is coupled with a touch panel, the input unit 410 may provide touch information sensed through the touch panel, to the processor 400. For example, the input unit 410 converts the touch information into an instruction such as touch_down, touch_move, touch_up, and the like, and provides the instruction to the processor 400.

The display unit 412 is formed as a Liquid Crystal Display (LCD), an Organic Light Emitted Diode (OLED), an Active Matrix Organic Light Emitted Diode (AMOLED), and the like. The display unit 412 displays state information of the electronic device, a text inputted by a user, a moving picture, a still picture, and the like. For example, the display unit 412 outputs an ARS screen of a display scheme provided by the web ARS server. If the display unit 412 is composed of a touch screen, the display unit 412 may provide touch information of the touch screen to the processor 400.

The storage unit 414 stores data generated during the execution of a program of the electronic device. For example, the storage unit 414 stores various updateable safekeeping data such as a phone book, an outgoing message, and an incoming message. According to exemplary embodiments of the present invention, the storage unit 414 stores authentication information used in an authentication process with the web ARS server. Further, the storage unit 414 can include a detachable extension memory.

The external I/O unit 140 includes a connection interface for connecting the electronic device 100 directly with other devices or connecting the electronic device 100 through a network.

Although not illustrated, the electronic device can further include constituent elements for providing supplementary functions, such as a camera module for image and/or video capture, a broadcasting reception module for broadcasting reception, a digital sound source playing module such as an MP3 module for media playback, a local area wireless communication module for local area wireless communication, a proximity sensor module for proximity detection, and the like, and software for operation thereof.

Figure 5A:
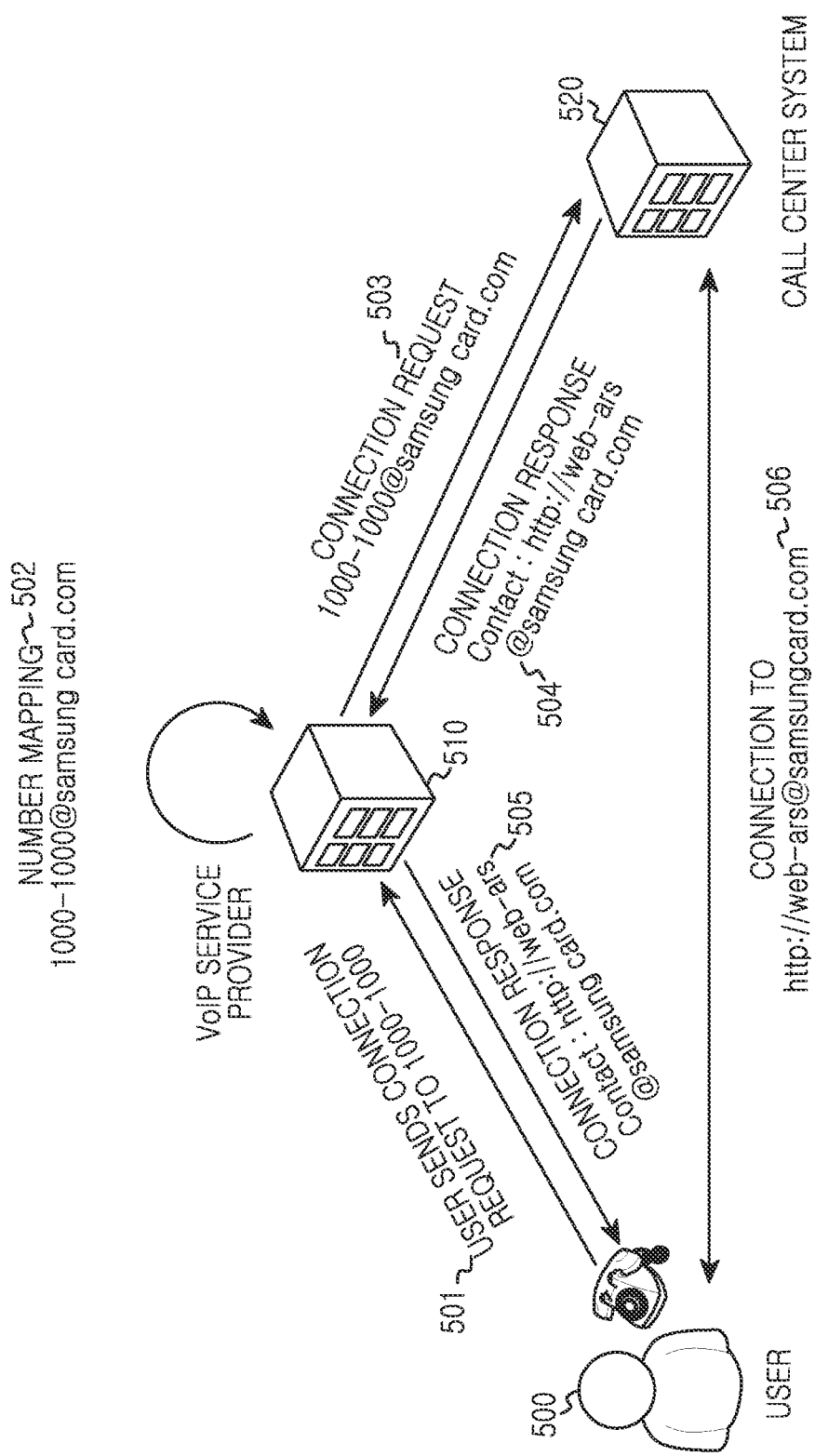
FIGS. 5A and 5B are diagrams illustrating an operation process of an ARS system according to an exemplary embodiment of the present invention.
Figure 5B:
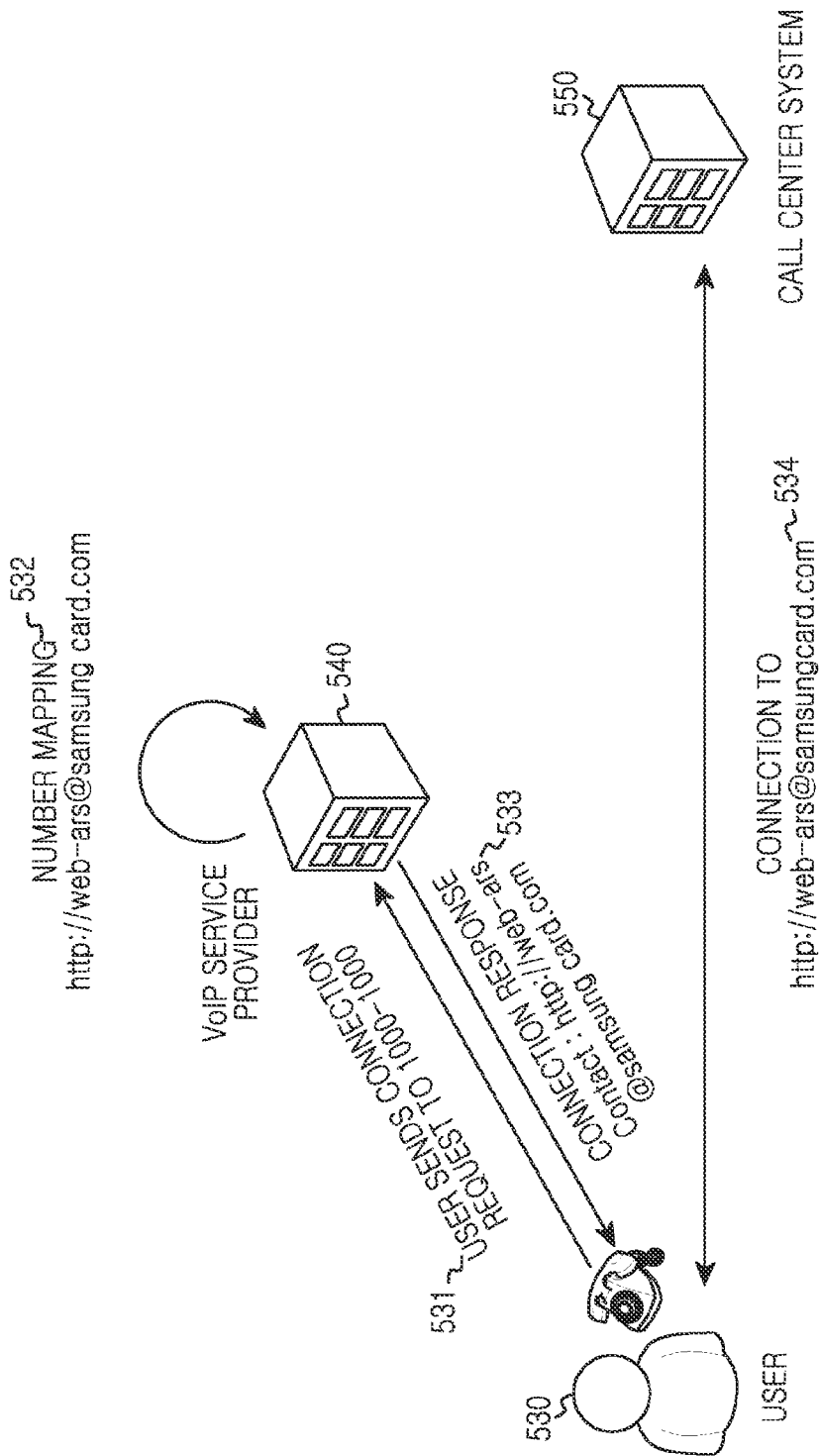

FIGS. 5A and 5B are diagrams illustrating an operation process of an ARS system according to an exemplary embodiment of the present invention.

Referring to FIG. 5A, an operation process of an ARS system according to an exemplary embodiment of the present invention is illustrated.

The ARS system can include a user telephone 500, a VoIP service provider 510, and a call center system 520.

The user telephone 500 is a telephone of a user who uses an ARS of a display scheme. The user telephone 500 receives connection information of a web ARS server of the call center system 520 providing the ARS of the display scheme from the call center system 520 and attempts access to the web ARS server of the call center system 520.

For example, in step 501, the user telephone 500 attempts call connection to a connection number '1000-1000' of the call center system 520 of "Samsungcard." In step 502, the VoIP service provider 510 can determine the connection number '1000-1000' of the call center system 520 and determine that an address of the call center system 520 providing the ARS of the display scheme corresponds to '1000-1000@samsungcard.com'. Thereafter, in step 503, the VoIP service provider 510 sends an ARS connection request to the call center system 520 by using the address '1000-1000@samsungcard.com' of the call center system 520.

Thereafter, in step 504, the VoIP service provider 510 receives a connection response notifying that an address of a web ARS server of the call center system 520 providing the ARS of the display scheme is 'http://web-ars@samsungcard.com' from the call center system 520. In step 505, the VOIP service provider 510 provides the received connection response to the user telephone 500. The VoIP service provider 510 has stored connection information of the call center system 520 corresponding to the connection number '1000-1000' of the call center system 520.

In step 506, the user telephone 500 processes to have access to the web ARS server having the address 'http://web-ars@samsungcard.com' by means of a web browser, and use the ARS of the display scheme.

Referring to FIG. 5B, an operation process of an ARS system according to an exemplary embodiment of the present invention is illustrated.

The ARS system can include a user telephone 530, a VoIP service provider 540, and a call center system 550.

The user telephone 530 corresponds to a telephone of a user who uses an ARS of a display scheme. The user telephone 530 receives connection information of a web ARS server of the call center system 550 providing the ARS of the display scheme from the VoIP service provider 540, and attempts access to the web ARS server of the call center system 550.

For example, in step 531, the user telephone 530 attempts call connection to a connection number '1000-1000' of the call center system 550 of "Samsungcard." In step 532, the VoIP service provider 540 can determine the connection number '1000-1000' of the call center system 550 and determine that an address of the web ARS server providing the ARS of the display scheme is 'http://Web-ars@samsungcard.com.' Thereafter, in step 533, the VOIP service provider 540 provides the address of the web ARS server providing the ARS of the display scheme to the user telephone 530. The VoIP service provider 540 has stored connection information of the web ARS server corresponding to the connection number '1000-1000' of the call center system 550.

In step 534, the user telephone 530 processes to have access to the web ARS server having the address 'http://Web-ars@samsungcard.com' by means of a web browser, and use the ARS of the display scheme.

FIGS. 6A and 6B are diagrams illustrating a structure of a message used for an ARS of a display scheme according to an exemplary embodiment of the present invention.

Referring to FIGS. 6A and 6B, the message includes a request message requesting for ARS connection as illustrated in FIG. 6A and a response message responding to the connection request as illustrated in FIG. 6B.

The request message is a message of requesting for call connection to a call center system through a Session Initiation Protocol (SIP).

FIGS. 6A and 6B illustrate a scenario in which a user 'bob' telephones to a telephone number '1000-1000' of the call center system.

FIG. 6A illustrates that a telephone of the user 'bob' sends a message 'INVITE' to a VoIP system, and FIG. 6B illustrates a response message generated by a VoIP service provider or a switch device within the call center system according to an exemplary embodiment of the present invention.

If an ARS of a display scheme corresponding to the connection request is provided, a 'Contact' field 610 of the response message includes connection information (e.g., URL information) of a web ARS server of the call center system.

As illustrated in FIG. 6B, the 'Contact' field 610 of the response message includes an address (e.g., "http://web-ars@samsungcard.com") of the web ARS server of the call center system.

According to exemplary embodiments of the present invention, the electronic device receiving the response message can analyze header information of the response message, acquire the connection information of the web ARS server, and have access to the web ARS server.

FIGS. 7A to 7E are diagrams illustrating a screen of an electronic device providing an ARS of a display scheme according to an exemplary embodiment of the present invention.

Figures 7A, 7B:
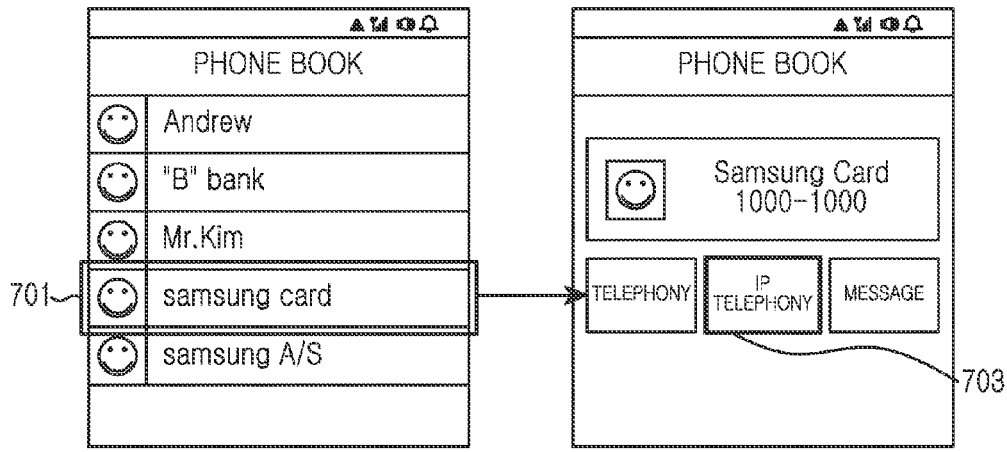
FIGS. 7A to 7E are diagrams illustrating a screen of an electronic device providing an ARS of a display scheme according to an exemplary embodiment of the present invention.

Referring to FIGS. 7A to 7E, the electronic device outputs connection information of call center systems providing an ARS of a display scheme, stored in a phone book as illustrated in FIG. 7A. FIG. 7A illustrates phone book information of the electronic device having stored phone numbers of users 'Andrew' and 'Mr. Kim' and contacts of bank 'B', 'Samsung-card', and 'Samsung After Service (A/S) center'.

After that, if the electronic device determines that a user selects a contact 701 of the call center system of Samsungcard that the user intends to connect on an outputted screen, then, as illustrated in FIG. 7B, the electronic device outputs detailed information of the call center system selected by the user. As illustrated in FIG. 7B, the electronic device outputs a menu comprising modes of communication with which the user may attempt connection with the call center system. For example, the menu may allow a user to attempt to establish a telephony connection to the call center system using a mobile communication network, to attempt to establish the telephony connection to the call center system using the Internet network, and to attempt to transmit a text message to the call center system.

Figures 7C, 7D:
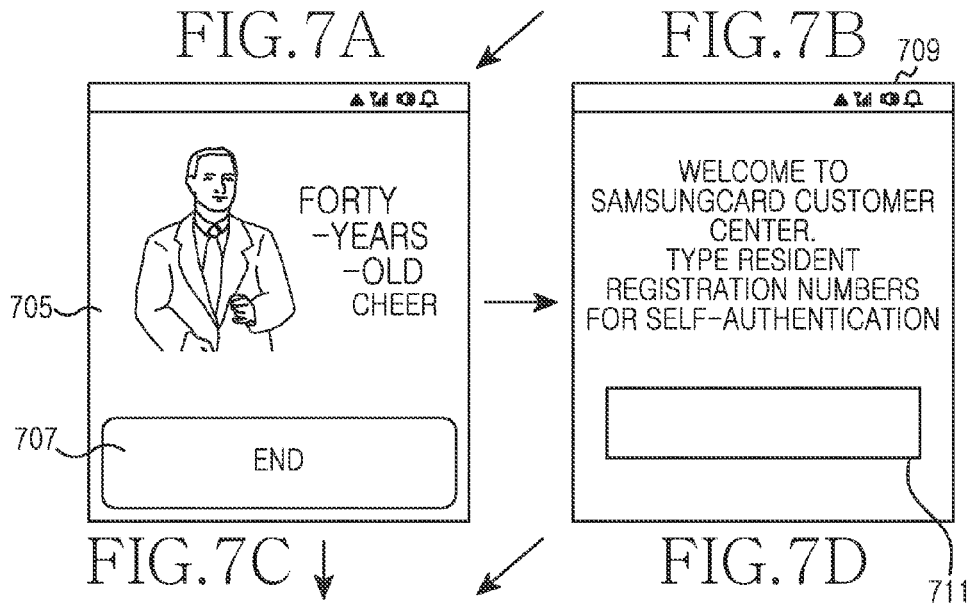

If the electronic device detects a user input 703 corresponding to selection to attempt to establish the telephony connection to the call center system using the Internet network, then, as illustrated in FIG. 7C, the electronic device outputs an initial connection screen of notifying the user that the electronic device is connecting with the call center system. According to an exemplary embodiment of the present invention, the electronic device can include, in the initial connection screen, a welcoming message of welcoming access to the call center system, a promoting screen 705 (e.g., an enterprise advertisement, an event, a notice, promotion information, and the like) of a corresponding enterprise, and a menu 707 enabling the user to end the connection and output the initial connection screen.

According to exemplary embodiments of the present invention, if a predefined time lapses, the electronic device automatically changes the output screen.

As an example, as illustrated in FIG. 7D, when a web ARS server of the call center system provides a service requiring an authentication process, the electronic device outputs page information for performing the authentication process. The user of the electronic device can input authentication information to an input window 711 of an outputted screen 709 comprising the outputted page information.

Figure 7E:
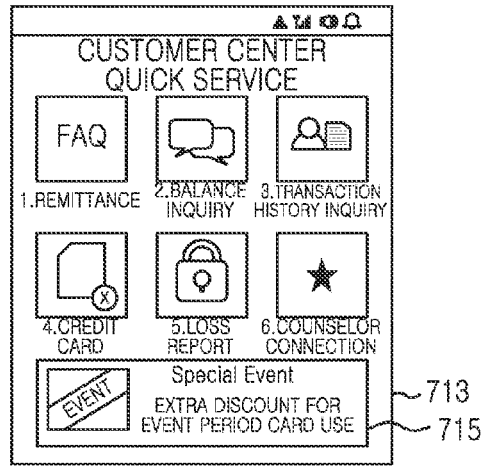

As illustrated in FIG. 7E, when the web ARS server of the call center system provides a service not requiring the authentication process, the electronic device processes to output a main screen 713 including an item of an ARS of a display scheme. According to an exemplary embodiment of the present invention, the electronic device can output an advertisement or event, promotion, a notice, and the like 715 on a partial region of the main screen, together. Undoubtedly, after the authentication screen of FIG. 7D is outputted, if the authentication process is completed, the electronic device may process to output the main screen 713.

Alternately, if determining that the input of attempting the telephony connection is selected by the user from the menu illustrated in FIG. 7B, the electronic device may just output the main screen 713 of FIG. 7E after omitting the initial connection screen of FIG. 7C and the authentication screen of FIG. 7D (e.g., the process may jump from the screen of FIG. 7B to the screen of FIG. 7E).

A procedure of outputting the screens of FIGS. 7B, 7C, 7D, and 7E is an exemplary embodiment of the present invention for illustrating a construction of the ARS of the display scheme, and the construction of the ARS of the display scheme can be modified in various manners by a service provider.

Figure 8:
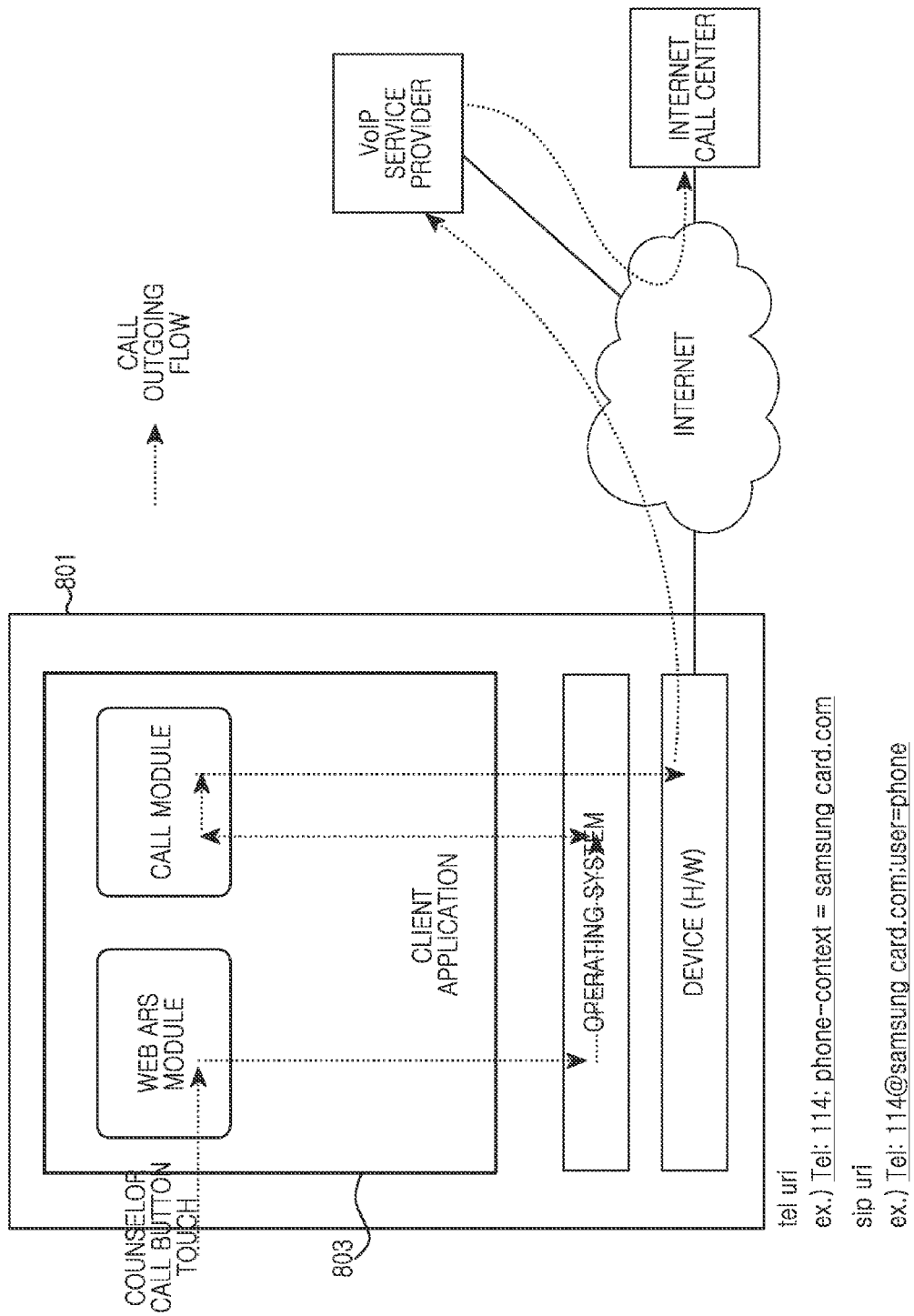
FIG. 8 is a diagram illustrating a process of requesting counselor connection in an electronic device according to an exemplary embodiment of the present invention.

FIG. 8 is a diagram illustrating a process of requesting for counselor connection in an electronic device according to an exemplary embodiment of the present invention.

Referring to FIG. 8, an application 803 providing an ARS of a display scheme is installed in the electronic device 801. A user can execute the application 803 to use the ARS of the display scheme. The application 803 includes a web ARS module for providing the ARS of the display scheme and a call module for providing call connection with a counselor. The web ARS module provides a menu of enabling counselor connection. If the user selects the menu of enabling the counselor connection, the web ARS module can detect the menu selection, determine an anchor (e.g., a SIP URI or a TEL URI link) information connected to the sensed menu, and request for the counselor connection directly to a call center system.

As an example, when the user touches a call center counselor connection button including a tel URL such as "tel: 114; phone-context=samsungcard.com" or a sip URL such as "sip: 114; samsungcard.com; user=phone" in a web ARS of Samsung Electronics, the application analyzes a corresponding request and connects the user with a call center counselor through the call module.

Figure 9:
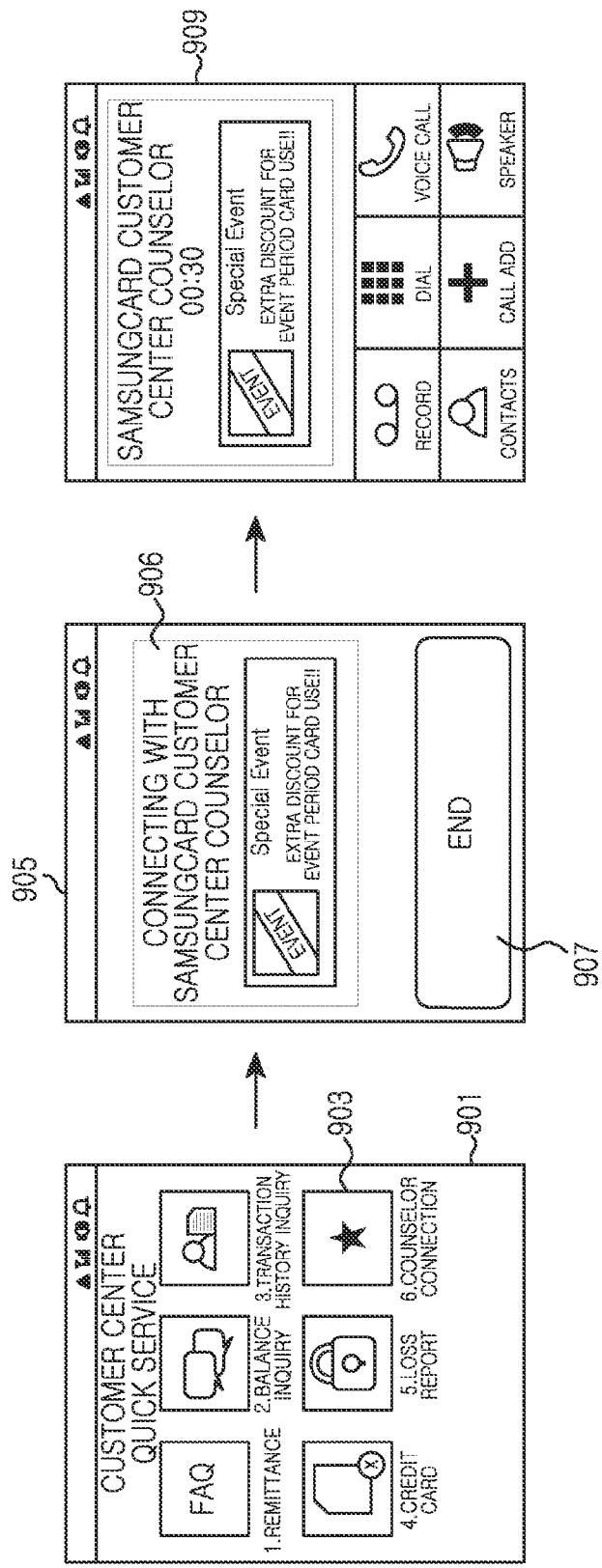
FIGS. 9A to 9C are diagrams illustrating a screen of attempting counselor connection in an electronic device according to an exemplary embodiment of the present invention.

FIGS. 9A to 9C are diagrams illustrating a screen of attempting counselor connection in an electronic device according to an exemplary embodiment of the present invention.

Referring to FIGS. 9A to 9C, if the electronic device determines that a user selects a counselor connection menu 903 included in an ARS screen 901 (e.g., main service screen) of a display scheme illustrated in FIG. 9A, the electronic device automatically processes to display a telephony connection screen. At this time, the electronic device can provide a general counselor connection screen or output a connection screen providing an advertisement of a corresponding enterprise.

As illustrated in FIG. 9B, the electronic device can output screen 905 comprising an advertising screen 906 of a corresponding enterprise such as an advertisement of the corresponding enterprise, event information thereof, a notice thereof, promotion information thereof, along with a menu (e.g., button) 907 of ending an ARS of a display scheme. Thereafter, as illustrated in FIG. 9C, the electronic device can output a screen 909 indicating that call connection with a counselor is established. When the call connection with the counselor is established, the electronic device generally provides a call connection time. Further, the electronic device can output an advertising screen of a corresponding enterprise on a partial region of the output screen even in a state in which the call connection is established according to exemplary embodiments of the present invention.

Figure 10:
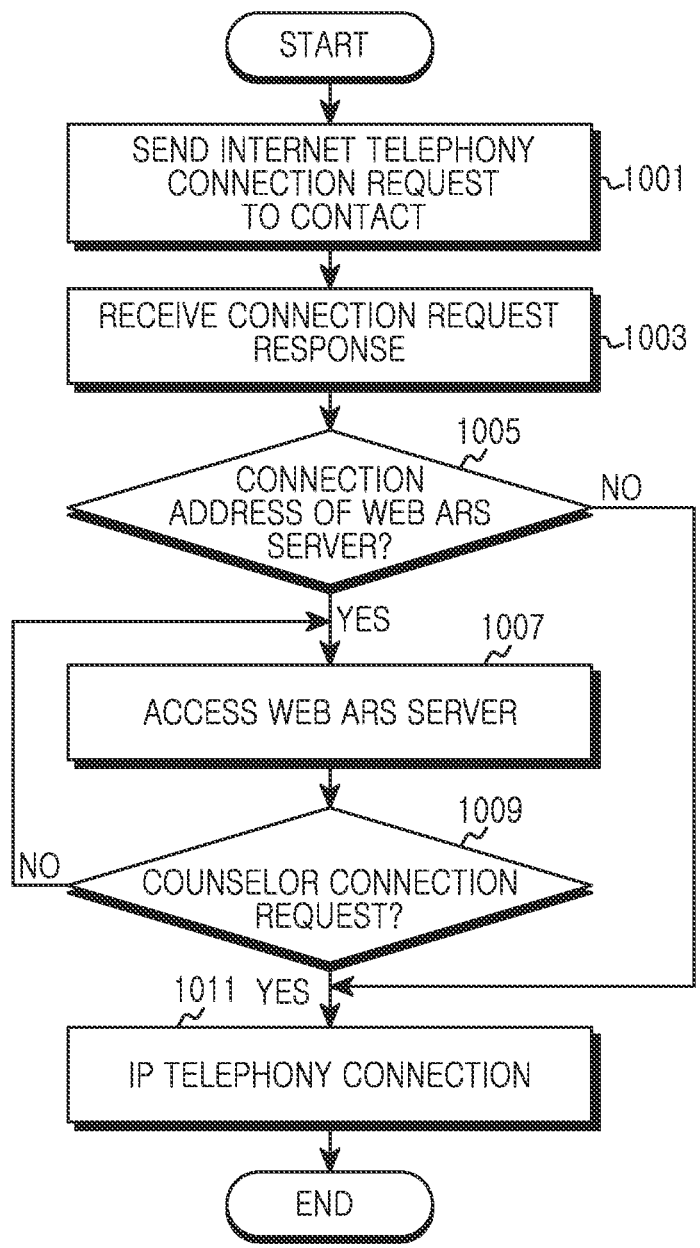
FIG. 10 is a flowchart illustrating a process of providing an ARS of a display scheme in an electronic device according to an exemplary embodiment of the present invention.

FIG. 10 is a flowchart illustrating a process of providing an ARS of a display scheme in an electronic device according to an exemplary embodiment of the present invention.

Referring to FIG. 10, in step 1001, the electronic device sends an IP telephony connection request to a service provider by using a contact.

In step 1003, the electronic device receives a connection request response from the service provider. The connection request response can include connection information of a web ARS server providing an ARS service of a display scheme as described above.

In step 1005, the electronic device determines whether the received connection request response includes the connection information of the web ARS server.

If the electronic device determines that the received connection response does not include the connection information of the web ARS server in step 1005, then the electronic device proceeds to step 1011, in which the electronic device makes a call with a counselor through IP telephony connection.

If the electronic device determines that the received connection response includes the connection information of the web ARS server in step 1005, then the electronic device proceeds to step 1007, in which the electronic device accesses the web ARS server by using the connection information included in the response message, and provides the ARS of the display scheme.

Thereafter, the electronic device proceeds to step 1009, in which the electronic device determines whether a connection request of a user with the counselor is detected. The electronic device determines whether the user selects a counselor connection menu on the ARS screen of the display scheme.

If the electronic device determines that the user does not select (e.g., if no selection is detected) a counselor connection menu on the ARS screen of the display scheme in step 1009, then the electronic device returns to step 1007 and continuously provides the ARS of the display scheme.

In contrast, if the electronic device determines that the user selects a counselor connection menu on the ARS screen of the display scheme in step 1009, then the electronic device proceeds to step 1011, in which the electronic device makes a call with the counselor through the IP telephony connection. Thereafter, the electronic device terminates the process of providing an ARS of a display scheme in an electronic device.

As described above, exemplary embodiments of the present invention provide an ARS of a display scheme through an electronic device and a call center system based on data, thereby enabling general users to reduce an automatic voice waiting time and use the ARS of the display scheme easily and conveniently. Further, a manager of the call center system can reduce a cost and concurrently, by using the ARS of the display scheme, provide a means of new advertisement (e.g., marketing) such as an advertisement, a notice, an event, and the like.

It will be appreciated that exemplary embodiments of the present invention according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An automatic response service (ARS) system for providing an internet protocol (IP) based ARS of a display scheme, the ARS system comprising:
   an electronic device configured to:
      send a connection request to a switch device through a voice internet protocol (VoIP) network, and
      receive, in response to the connection request, information including an IP address of a web ARS server of a call center system from the switch device,
   wherein the switch device is configured to:
      determine an IP address of a call center system based on the connection request,
      send the connection request to the call center system,
      acquire the information including the IP address of the web ARS server of the call center system, and
      transmit the acquired information to the electronic device, and
   wherein the electronic device is further configured to:
      form a data session with the web ARS server of the call center system using the received connection information of the web ARS server, and
      provide the ARS of the display scheme using information received from the web ARS server.

2. The system of claim 1,
   wherein the switch device is a switch device included within a VoIP service provider or the call center system, and
   wherein the switch device is further configured to determine the IP address of the call center system, the IP address being corresponding to a call number of the call center system included in the connection request.

3. The system of claim 1, wherein, the information includes a request for authentication information.

4. A method for providing an internet protocol (IP) based automatic response service (ARS) of a display scheme in an electronic device, the method comprising:
   sending a connection request to a switch device through a voice internet protocol (VoIP) network, the switch device determining an IP address of a call center system based on the connection request and sending the connection request to the call center system;
   receiving, in response to the connection request, information including an IP address of a web ARS server of the call center system from the switch device, when the switch device acquires the information from the call center system and transmits the information to the electronic device;
   establishing a data session with the web ARS server using the information; and
   displaying a main screen for indicating a type of service provided from the web ARS server of the call center system.

5. The method of claim 4, further comprising:
   if it is determined that a counselor connection is selected on the displayed main screen, acquiring an anchor information of the counselor connection; and
   attempting the counselor connection by using the acquired anchor information,
   wherein the anchor information corresponds to counselor connection uniform resource identifier (URI) information of the call center system.

6. The method of claim 4, wherein the anchor information of the counselor connection menu comprises one of a telephone (Tel) URI information and a session initiation protocol (SIP) URI information.

7. The method of claim 4, further comprising:
   displaying a promoting screen comprising at least one an enterprise advertisement, an event, a notice, and promotion information until the data session with the web ARS server is established.

8. The method of claim 4, further comprising performing an authentication process with the call center system.

9. An electronic device for providing an internet protocol (IP) based automatic response service (ARS) of a display scheme, the device comprising:
   a display unit; and
   a controller configured to:
      send a connection request to a switch device through a voice internet protocol (VoIP) network, the switch device determining an IP address of a call center system based on the connection request and sending the connection request to the call center system,
      receive, in response to the connection request, information including an IP address of a web ARS server of the call center system from the switch device, when the switch device acquires the information from the call center system and transmits the information to the electronic device,
      establish a data session with the web ARS server using the information, and
      display a main screen for indicating a type of service provided from the web ARS server of the call center system via the display unit.

10. The device of claim 9, wherein, if it is determined that counselor connection is selected on the displayed main screen, controller is further configured to:
    acquire an anchor information of the counselor connection, and
    attempt the counselor connection by using the acquired anchor information,
    wherein the anchor information corresponds to counselor connection uniform resource identifier (URI) information of a call center system.

11. The device of claim 9, wherein the anchor information of the counselor connection menu comprises one of a telephone (Tel) URI information and a session initiation protocol (SIP) URI information.

12. The device of claim 9, wherein the controller is further configured to display a promoting screen comprising at least one an enterprise advertisement, an event, a notice, and promotion information until the data session with the web ARS server is established.

13. The device of claim 9, wherein the controller is further configured to perform an authentication process with the call center system.

\* \* \* \* \*